(12) United States Patent
Sanders et al.

(10) Patent No.: US 12,296,431 B2
(45) Date of Patent: May 13, 2025

(54) AUTOMATED CAVITATION PROCESSING

(71) Applicant: The Boeing Company, Chicago, IL (US)

(72) Inventors: Daniel Gordon Sanders, Cle Elum, WA (US); Kandaudage Channa Ruwan De Silva, Summerville, SC (US)

(73) Assignee: The Boeing Company, Chicago, IL (US)

(*) Notice: Subject to any disclaimer, the term of this patent is extended or adjusted under 35 U.S.C. 154(b) by 582 days.

(21) Appl. No.: 17/541,195

(22) Filed: Dec. 2, 2021

(65) Prior Publication Data
US 2023/0173641 A1    Jun. 8, 2023

(51) Int. Cl.
| | | |
|---|---|---|
| *B24C 7/00* | (2006.01) | |
| *B08B 3/04* | (2006.01) | |
| *B24C 1/08* | (2006.01) | |
| *B24C 1/10* | (2006.01) | |
| *B24C 9/00* | (2006.01) | |

(52) U.S. Cl.
CPC ............ *B24C 7/0007* (2013.01); *B08B 3/045* (2013.01); *B24C 1/08* (2013.01); *B24C 1/10* (2013.01); *B24C 9/00* (2013.01)

(58) Field of Classification Search
CPC .......... B24C 1/08; B24C 1/083; B24C 1/086; B08B 3/045
See application file for complete search history.

(56) References Cited

U.S. PATENT DOCUMENTS

| | | |
|---|---|---|
| 3,807,632 A | 4/1974 | Johnson, Jr. |
| 4,342,425 A | 8/1982 | Vickers |
| 4,474,251 A | 10/1984 | Johnson, Jr. |
| 5,316,591 A | 5/1994 | Chao et al. |
| 5,522,941 A | 6/1996 | Uchinami et al. |
| 5,778,713 A | 7/1998 | Butler et al. |
| 5,820,688 A | 10/1998 | Köppl et al. |
| 6,280,302 B1 | 8/2001 | Hashish et al. |
| 6,341,151 B1 | 1/2002 | Enomoto et al. |
| 6,425,276 B1 | 7/2002 | Hirano et al. |
| 6,855,208 B1 | 2/2005 | Soyama |
| 6,993,948 B2 | 2/2006 | Offer |
| 7,494,073 B2 | 2/2009 | Pivovarov |

(Continued)

FOREIGN PATENT DOCUMENTS

| | | |
|---|---|---|
| CN | 101670556 A | 3/2010 |
| CN | 102430987 A | 5/2012 |

(Continued)

OTHER PUBLICATIONS

Machine translation of DE-102015116196-B3, dated Feb. 23, 2017. (Year: 2017).*

(Continued)

*Primary Examiner* — Joseph L. Perrin
*Assistant Examiner* — Kevin G Lee
(74) *Attorney, Agent, or Firm* — Yee & Associates, P.C.

(57) ABSTRACT

A cavitation peening system is disclosed, including a tank containing a fluid, a carrier, and an array of cavitation nozzles. The carrier is configured to deliver a workpiece to a treatment zone in the tank, and the array of cavitation nozzles are collectively configured to generate a cavitation induced whirlpool in the treatment zone.

20 Claims, 3 Drawing Sheets

(56) References Cited

U.S. PATENT DOCUMENTS

| | | | |
|---|---|---|---|
| 8,833,444 | B2 | 9/2014 | McAfee et al. |
| 9,050,642 | B2 | 6/2015 | Alberts et al. |
| 9,200,341 | B1 | 12/2015 | Sanders et al. |
| 9,433,986 | B2 | 9/2016 | Ogawa et al. |
| 9,573,246 | B2 | 2/2017 | Maeguchi et al. |
| 9,739,695 | B2 | 8/2017 | Michishita et al. |
| 10,233,511 | B1 | 3/2019 | Sanders et al. |
| 10,265,833 | B2 | 4/2019 | Sanders et al. |
| 10,836,012 | B2 | 11/2020 | Sanders |
| 2002/0098776 | A1 | 7/2002 | Dopper |
| 2004/0187891 | A1 | 9/2004 | Chou et al. |
| 2004/0235389 | A1 | 11/2004 | Hashish et al. |
| 2005/0017090 | A1 | 1/2005 | Pivovarov |
| 2005/0139697 | A1 | 1/2005 | Pivovarov |
| 2005/0103362 | A1* | 5/2005 | Soyama .................. B24C 1/10 134/198 |
| 2006/0151634 | A1 | 7/2006 | Pivovarov |
| 2010/0255759 | A1 | 10/2010 | Ohashi et al. |
| 2012/0118562 | A1 | 5/2012 | McAfee et al. |
| 2013/0284440 | A1 | 10/2013 | McAfee et al. |
| 2019/0061103 | A1* | 2/2019 | Sanders ............... B05B 7/1463 |
| 2019/0061104 | A1 | 2/2019 | Sanders et al. |
| 2019/0308292 | A1 | 10/2019 | Nagalingam et al. |
| 2020/0009620 | A1 | 1/2020 | Tibbetts et al. |
| 2020/0189068 | A1* | 6/2020 | Sanders ................. B01F 25/30 |
| 2021/0387309 | A1 | 12/2021 | Sanders et al. |

FOREIGN PATENT DOCUMENTS

| | | | |
|---|---|---|---|
| CN | 102649994 | A | 8/2012 |
| CN | 103415358 | A | 11/2013 |
| CN | 104440584 | A | 3/2015 |
| CN | 205438241 | U | 8/2016 |
| CN | 106392863 | A | 2/2017 |
| DE | 60031257 | T2 | 2/2007 |
| DE | 102006037069 | A1 | 2/2007 |
| DE | 60030341 | T2 | 8/2007 |
| DE | 102015116196 | B3 * | 2/2017 |
| EP | 0450222 | A2 | 10/1991 |
| EP | 1500712 | B1 | 8/2006 |
| EP | 1170387 | B1 | 10/2006 |
| EP | 2546026 | A1 | 1/2013 |
| EP | 2736678 | B1 | 9/2015 |
| JP | H04362124 | A | 12/1992 |
| JP | 406047672 | A | 2/1994 |
| JP | H0647667 | A | 2/1994 |
| JP | H07328855 | A | 12/1995 |
| JP | H07328857 | A | 12/1995 |
| JP | H07328859 | A | 12/1995 |
| JP | H07328860 | A | 12/1995 |
| JP | H0871919 | A | 3/1996 |
| JP | H0890418 | A | 4/1996 |
| JP | 2003062492 | A | 3/2003 |
| JP | 3127847 | U | 12/2006 |
| JP | 2007075958 | A | 3/2007 |
| JP | 2007-260550 | A | 10/2007 |
| JP | 4240972 | B2 | 3/2009 |
| JP | 2009090443 | A | 4/2009 |
| JP | 2011-245582 | A | 12/2011 |
| JP | 2012230253 | A | 11/2012 |
| JP | 2013082030 | A | 5/2013 |
| JP | 5578318 | A | 8/2014 |
| JP | 5876701 | B2 | 3/2016 |
| JP | 2016161349 | A * | 9/2016 |
| JP | 2016221650 | A | 12/2016 |
| KR | 100390661 | B1 | 6/2003 |
| WO | 9528235 | A1 | 10/1995 |
| WO | 2009154567 | A1 | 12/2009 |
| WO | 2012157619 | A1 | 11/2012 |
| WO | 2013019317 | A1 | 2/2013 |
| WO | 2016131483 | A1 | 8/2016 |

OTHER PUBLICATIONS

Korean Intellectual Property Office, Office Action regarding Korean Patent Application No. 10-2018-0102673, dated Nov. 14, 2022, 13 pages.

European Patent Office, Extended European Search Report regarding European Patent Application No. 23175272.6 dated Nov. 20, 2023, 11 pages.

Chahine, Georges L., et al., "Cleaning and Cutting with Self-Resonating Pulsed Water Jets", 2nd US Water Jet Conference, 1983, pp. 195-207.

Vijay, M., et al., "A study of the practicality of cavitating water jets", Jet Cutting Technology, 1992, vol. 13, pp. 75-99.

Soyama, et al., Use of Cavitating Jet for Introducing Compressive Residual Stress, Article in Journal of Manufacturing Science and Engineering, vol. 22, Feb. 2000, 7 pages.

Macian, V., et al., "A CFD analysis of the influence of diesel nozzle geometry on the inception of cavitation", Atomization and Sprays, 2003, vol. 13, pp. 579-604.

Payri, Raul, et al. "A study of the relation between nozzle geometry, internal flow and sprays characteristics in diesel fuel injection systems", KSME International Journal, 2004, vol. 18, No. 7, pp. 1222-1235.

Desantes, J., et al., "Experimental characterization of outlet flow for different diesel nozzle geometries", 2005, No. 2005-01-2120, SAE Technical Paper, 10 pages.

Turski, et al., Engineering the residual stress state and microstructure of stainless steel with mechanical surface treatments, Article for Springer-Verlag, May 11, 2010, 8 pages.

Hattori, Shuji, et al., "Prediction method for cavitation erosion based on measurement of bubble collapse impact loads." Wear 269.7-8 (2010), published online Jun. 25, 2010: pp. 507-514.

Takakuwa, Osamu, et al., "Suppression of hydrogen-assisted fatigue crack growth in austenitic stainless steel by cavitation peening." International journal of hydrogen energy 37.6 (2012), published online Jan. 2, 2012: pp. 5268-5276.

Soyama, Hitoshi, "Effect of nozzle geometry on a standard cavitation erosion test using a cavitating jet." Wear 297.1-2 (2013), published online Nov. 15, 2012: pp. 895-902.

Patella, Regiane Fortes, et al., "Mass loss simulation in cavitation erosion: Fatigue criterion approach." Wear 300.1-2 (2013), published online Feb. 13, 2013: pp. 205-215.

Mitelea, Ion, et al. "Ultrasonic cavitation erosion of nodular cast iron with ferrite-pearlitic microstructure." Ultrasonics Sonochemistry 23 (2015), published online Nov. 10, 2014: pp. 385-390.

Li, Deng, et al., "Effects of nozzle inner surface roughness on the cavitation erosion characteristics of high speed submerged jets." Experimental Thermal and Fluid Science 74 (2016), published online Jan. 28, 2016: pp. 444-452.

Sato, et al., Using Cavitation Peening to Improve the Fatigue Life of Titanium Alloy Ti-6Al-4V Manufactured by Electron Beam Melting, Article for Scientific Research Publishing, Apr. 20, 2016, 11 pages.

Deng, Li et al., "Experimental study on the effect of feeding pipe diameter on the cavitation erosion performance of self-resonating cavitating waterjet", Experimental Thermal and Fluid Science, Elsevier, Amsterdam, NL, vol. 82, Nov. 27, 2016, pp. 314-325.

Marcon, Andrea, Water Cavitation Peening for Aerospace Materials—A Dissertation Presented to the Academic Faculty at The Georgia Institute of Technology, Jan. 2017, 211 pages.

Tan, K.L., et al. Surface Modification of Additive Manufactured Components by Ultrasonic Cavitation Abrasive Finishing, Wear, 378-379, 2017, 90-95 pg, Singapore.

U.S. Patent and Trademark Office, Office action regarding U.S. Appl. No. 15/693,409, dated May 30, 2018, 11 pages.

U.S. Patent and Trademark Office, Office action regarding U.S. Appl. No. 15/693,417, dated May 30, 2018, 10 pages.

European Patent Office, Extended European Search Report in European Patent Application No. 18190086.1, dated Feb. 5, 2019, 7 pages.

European Patent Office, Extended European Search Report in European Patent Application No. 18189818.0, dated Feb. 6, 2019, 10 pages.

(56) References Cited

OTHER PUBLICATIONS

European Patent Office, Extended European Search Report in European Patent Application No. 18190518.3, dated Feb. 6, 2019, 12 pages.

European Patent Office, Examination Report regarding European Patent Application No. 18190086.1, dated Jul. 30, 2019, 4 pages.

European Patent Office, Examination Report regarding European Patent Application No. 18189818.0, dated Oct. 24, 2019, 4 pages.

Tan, K. L., et al., "Surface finishing on IN625 additively manufactured surfaces by combined ultrasonic cavitation and abrasion." Additive Manufacturing 31 (2020) 100938, published online Nov. 6, 2019, 22 pages.

U.S. Patent and Trademark Office, Non-Final Office Action regarding U.S. Appl. No. 15/693,401, dated Nov. 15, 2019, 20 pages.

Ma, Wei, et al., "Experimental Research on the Waterjet Oscillating Characteristics of Helmholtz Nozzle", Journal of Applied Science and Engineering, 2019, vol. 22, No. 1, pp. 83-92.

European Patent Office, Communication Pursuant to Article 94(3) EPC regarding European Patent Application No. 18190086.1, dated May 7, 2020, 4 pages.

Campo, Frank, et al. "SERDP & ESTCP Webinar Series: Reducing Hazardous Materials in Weapons Systems: Advances in Waterjet Applications and Cold Spray Technologies" video, retrieved from the internet on Jan. 6, 2021, from www.serdp-estcp.org/Tools-and-Training/Webinar-Series/09-10-2020, published Sep. 10, 2020, 2 pages.

European Patent Office, Examination Report regarding European Patent Application No. 18189818.0 dated Jan. 12, 2021, 5 pages.

The State Intellectual Property Office of P.R.C., First Office Action and Search Report regarding Chinese Patent Application No. 2018109918271, dated Mar. 30, 2021, 18 pages.

The State Intellectual Property Office of P.R.C., First Office Action and Search Report regarding Chinese Patent Application No. 2018109917851, dated Jun. 2, 2021, 17 pages.

European Patent Office, Examination Report regarding European Patent Application No. 18190518.3, dated Jun. 21, 2021, 6 pages.

European Patent Office, Extended European Search Report in European Patent Application No. 21178917.7, dated Nov. 8, 2021, 10 pages.

* cited by examiner

AUTOMATED CAVITATION PROCESSING

BACKGROUND

Cavitation peening and Cavitation Abrasive Surface Finishing (CASF) are promising new treatment methods for a variety of manufactured metal parts. Cavitation bubbles are formed in a fluid by a transition to gas phase resulting from an increase in flow velocity and internal energy, then collapse as the flow velocity and pressure surrounding the bubbles dissipates. When a cavitation bubble collapses, a micro-jet is produced that can peen a surface on impact and/or energize particles of an abrasive material sufficiently that particle impact removes material from the surface.

Cavitation processes can be cheaper, safer, faster, and have a lower environmental impact than previous methods of peening, cleaning, and smoothing surfaces. Inexpensive water and inert abrasives can be used in place of expensive and potentially dangerous shot media, chemical cleaners, or acids. However, currently used cavitation processing systems are generally configured for manual treatment of individual parts, and are appropriate only for lab-based research and prototyping. A cavitation processing system appropriate for automated high-throughput is needed to realize the advantages of these processes on a mass production scale.

SUMMARY

The present disclosure provides systems, apparatus, and methods relating to automated cavitation peening and abrasive surface finishing. In some examples, a cavitation abrasive surface finishing system may include a work area in a tank containing a slurry of a fluid and an abrasive media, and a plurality of cavitation nozzles directed toward the work area. The cavitation nozzles may be connected by high-pressure hoses to a high-pressure fluid pump. The system may further include an abrasive media supply configured to add abrasive media to the tank, a density monitoring system configured to monitor a density of abrasive media in the slurry contained in the tank, and a reclamation system configured to collect abrasive media from the tank. The system may further include a controller configured to receive data from the density monitoring system and regulate the abrasive media supply and the reclamation system to maintain a selected density of abrasive media in the slurry contained in the tank.

In some examples, an automated cavitation peening system may include a tank filled with a fluid, a plurality of cavitation nozzles positioned around a periphery of the tank, and a fluid supply including a pump connected to a manifold. The fluid supply may supply high-pressure fluid to the plurality of cavitation nozzles, which may be directed toward a central region of the tank. The system may further include a rack configured to support a one or more workpieces, a manipulation device configured to lower the rack into the tank, and a controller regulating the supply of high-pressure fluid and directing movement of the manipulation device.

Features, functions, and advantages may be achieved independently in various examples of the present disclosure, or may be combined in yet other examples, further details of which can be seen with reference to the following description and drawings.

DETAILED DESCRIPTION

Various aspects and examples of an automated cavitation processing system, as well as related methods, are described below and illustrated in the associated drawings. Unless otherwise specified, an automated cavitation processing system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, an automated cavitation processing system in accordance with the present teachings may include a plurality of cavitation nozzles directed toward a treatment zone or work area. The nozzles may be supplied with a high-pressure fluid and either disposed in a tank filled with fluid or supplied with a low-pressure fluid. A set of workpieces may be moved into the treatment zone by a carrier. A controller may be operatively connected to both the fluid supply for the nozzles and the carrier for automatic processing of the workpieces. The controller may activate the nozzles and move the workpiece(s) through a predetermined sequence based on the part geometry and desired cavitation peening process and/or surface finishing process.

Figure 1:
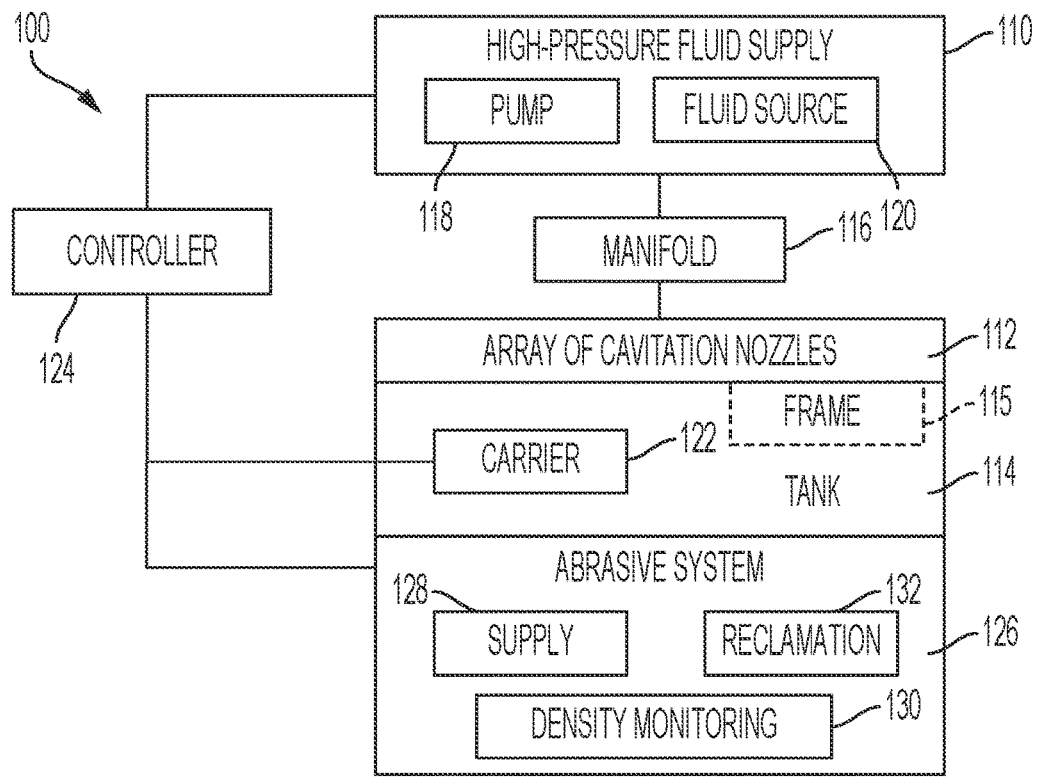
FIG. 1 is a schematic diagram of an illustrative automated cavitation processing system in accordance with aspects of the present disclosure.

FIG. 1 is a schematic diagram of an example of a cavitation processing system 100. The system includes a high-pressure fluid supply 110, and an array of cavitation nozzles 112 submerged in a tank 114 containing a fluid. The fluid supply is connected to the array of cavitation nozzles by at least one manifold 116. Nozzle array 112 may be supported by tank 114, and/or the array may include an optional support structure or frame 115 configured to hold the nozzles in a selected position and orientation.

Each nozzle of array 112 may be directed toward a treatment zone in tank 114. For example, the array of nozzles may be mounted around a peripheral wall of the tank, oriented inward toward a central region of the tank. In some examples, a support structure for the nozzles may be passively adjustable to allow repositioning and/or may be equipped for active movement to allow dynamic treatment. In general, system 100 may include any number, pattern, combination, and/or arrangement of cavitation nozzles and/or arrays of cavitation nozzles.

Fluid supply 110 includes a pump 118 and a fluid source 120, configured to deliver high-pressure fluid to array of cavitation nozzles 112. For example, fluid source 120 may be a water tank or a connection to a municipal water supply, and pump 118 may be configured for high-pressure operation. In some examples, fluid supply 110 may also include one or more additional pumps and/or fluid sources, according to a selected processing method or methods. For instance, the fluid supply may include a pump configured for low-pressure operation and/or may include a source of an abrasive slurry, for use with co-flow cavitation nozzles. Such a slurry may be a mixture of a liquid and abrasive media.

High-pressure fluid from fluid supply 110 may be dispensed from array of cavitation nozzles 112 into tank 114 as cavitating jets. The cavitating jets may interact with the fluid filling the tank to form a cloud of cavitation bubbles. Tank 114 may be cylindrical, and the nozzles may be positioned and oriented to generate a whirlpool current in the tank, which may also be described as a vortex or revolving flow of fluid. In some examples, the cavitation bubbles may excite particles of an abrasive suspended in the fluid. A workpiece in the treatment zone may be thereby peened and surface finished.

Any desired fluid or fluids may be used for cavitation. The high-pressure fluid dispensed from array of cavitation nozzles 112 may be the same or different from the fluid filling tank 114. For example, the nozzles may dispense high-pressure water into a tank of atmospheric pressure water. For another example, the nozzles may dispense water into a tank of abrasive slurry, including particles of an abrasive media suspended in water. Water may be preferred, as an inexpensive fluid that is safe and easy to work with. Properties such as viscosity of the fluid used may affect collapsing force of cavitation bubbles and a fluid may be chosen to improve impact, or decrease the pressure required for a desired impact level. The fluid may also be selected according to properties of an abrasive material used, and/or to achieve desired properties of an abrasive slurry.

Any effective abrasive material or mixture of materials may be used. For example, the abrasive material may include metal, glass, ceramic, silica oxide, yttrium, garnet, aluminum oxide, pumice, nut shells, corn cob, and/or plastic particles. For another example, the abrasive material may include natural or synthetic rubber, silicon, fluoropolymer, elastomer, Viton, Teflon, and/or a Fullerene based carbon nano-material particles. All particles may preferably be within a range of approximately 16 to 1200 ANSI grit size.

System 100 further includes a carrier 122 to support and transport a set of workpieces. The carrier is configured to releasably secure the workpieces, and move the workpieces into and out of tank 114. In some examples, the carrier may also be configured to move the workpieces forward, back, left, and/or right, to agitate the workpieces, and/or to rotate the workpieces. Carrier 122 may include a manipulation device and a hanger, rack, or other material handing device. Carrier 122 may be configured according to a size, weight, and geometry of the workpieces, as well as according to a desired treatment sequence.

In examples where system 100 is configured for abrasive surface finishing, the system further includes an abrasive system 126. Abrasive system 126 may be integrated with fluid supply 110 and/or an auxiliary system as depicted in FIG. 1. The abrasive system may include an abrasive supply 128, a density monitoring system 130, and a reclamation system 132.

As high-pressure fluid is injected into tank 114, a ratio of liquid to abrasive particles in a slurry contained in the tank may be affected. Particles of abrasive material may also tend to fall out of suspension in the slurry over time, under the action of gravity. Maintaining a selected density or concentration of abrasive material in the slurry may be important to achieve a desired material removal rate (MRR).

Density monitoring system 130 is configured to monitor saturation density and may measure abrasive in the tank at selected intervals, or throughout treatment. Any effective sensors and/or measurements may be used to evaluate abrasive by volume and/or by weight. For example, strain gauges may be mounted on the bottom of tank 114 to measure overall tank weight, from which abrasive weight may be calculated. For another example, laser diffraction sensors may be used to measure wavelength transmission of the slurry.

To maintain the desired ratio, abrasive material from abrasive supply 128 and/or reclamation system 132 may be added to tank 114. In some examples, a selected density range may be maintained by addition of abrasive or fluid. To maintain suspension of the slurry, abrasive system 126 may further include a mixing device such as a mechanical or ultrasonic agitator, or a diaphragm pump.

Reclamation system 132 may collect abrasive expended during treatment and/or settled out of suspension. The reclamation system may include one or more of an overflow tank, a drain, a pump, a vacuum, and an autonomous vehicle. Reclamation system 132 may further include a filter or filtration system to separate out depleted abrasive. Remaining abrasive may be returned to the abrasive slurry in the tank or to the abrasive supply for reincorporation.

A controller 124 is operatively connected to fluid supply 110, carrier 122, and abrasive system 126. In examples where the support structure for array of cavitation nozzles 112 includes active movement control, the controller may also be operatively connected to the nozzle support structure. Controller 124 may include any programmable logic controller (PLC) system and/or digital processing system configured for automation of system 100, such as PLC system 400, described below.

Controller 124 may be programmable by a user with a desired treatment sequence. The controller may be operable to actuate control valves of fluid supply 110 to initiate generation of cavitation bubble clouds in the treatment zone of tank 114 by array of cavitation nozzles 112, and to modulate supplied pressure, temperature, or other parameters relevant to cavitation intensity. The controller may receive data regarding such parameters from one or more sensors located in fluid supply 110, nozzles of array 112, tank 114, on carrier 122, or on one or more workpieces.

Controller 124 may be further operable to control movement of carrier 122. The controller may coordinate initiation of fluid flow from nozzles of array 112 with movement of the carrier. Controller 124 may direct carrier 122 through a predetermined sequence of movements, including movements such as entering tank 114, moving forward and backward and/or up and down relative to array of nozzles 112 at a selected rate, remaining still for a selected time period, and/or rotating through selected angles.

Controller 124 may be programmed to coordinate operations of abrasive system 126, and maintain desired parameters of a slurry contained in tank 114. Recapture, reintroduction and/or re-mixing of abrasives may be regulated by the controller, which may be in communication with elements of abrasive supply 128, density monitoring system 130, and reclamation system 132.

Examples, Components, and Alternatives

The following sections describe selected aspects of exemplary cavitation processing systems as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative Whirlpool Automated Cavitation Processing System

Figure 2:
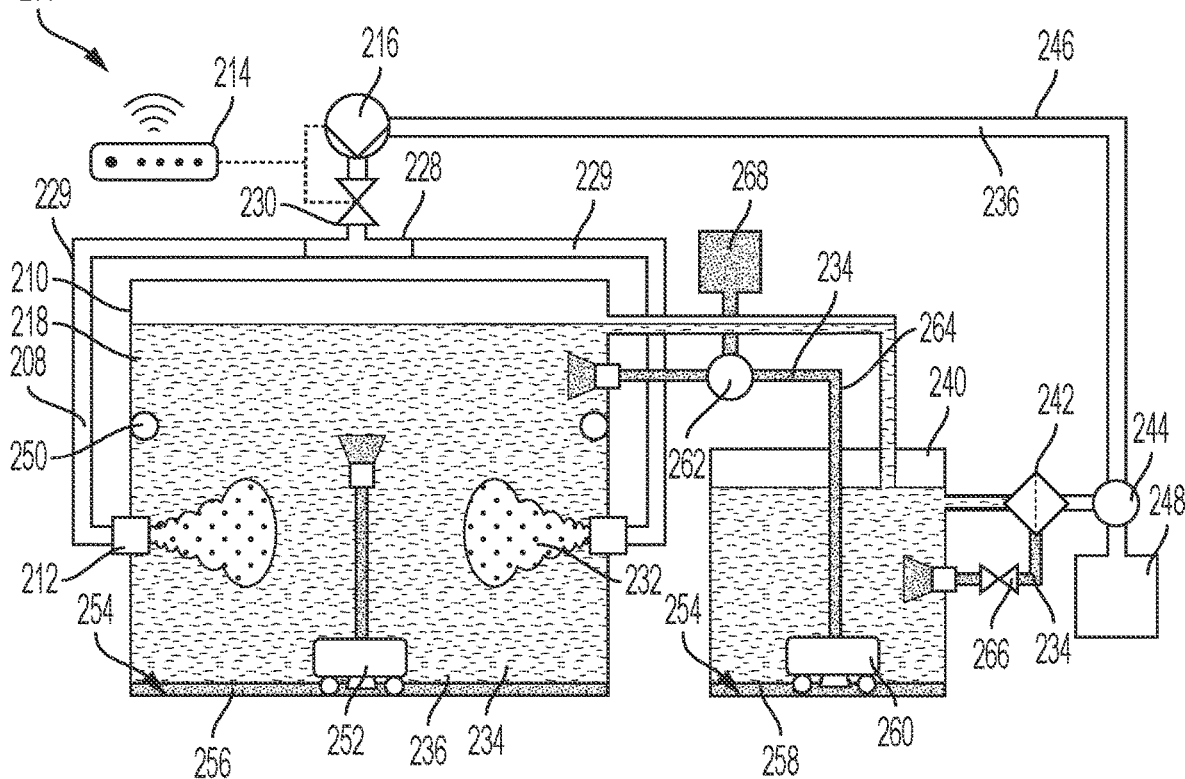
FIG. 2 is a schematic diagram of another illustrative automated cavitation peening system.
Figure 3:
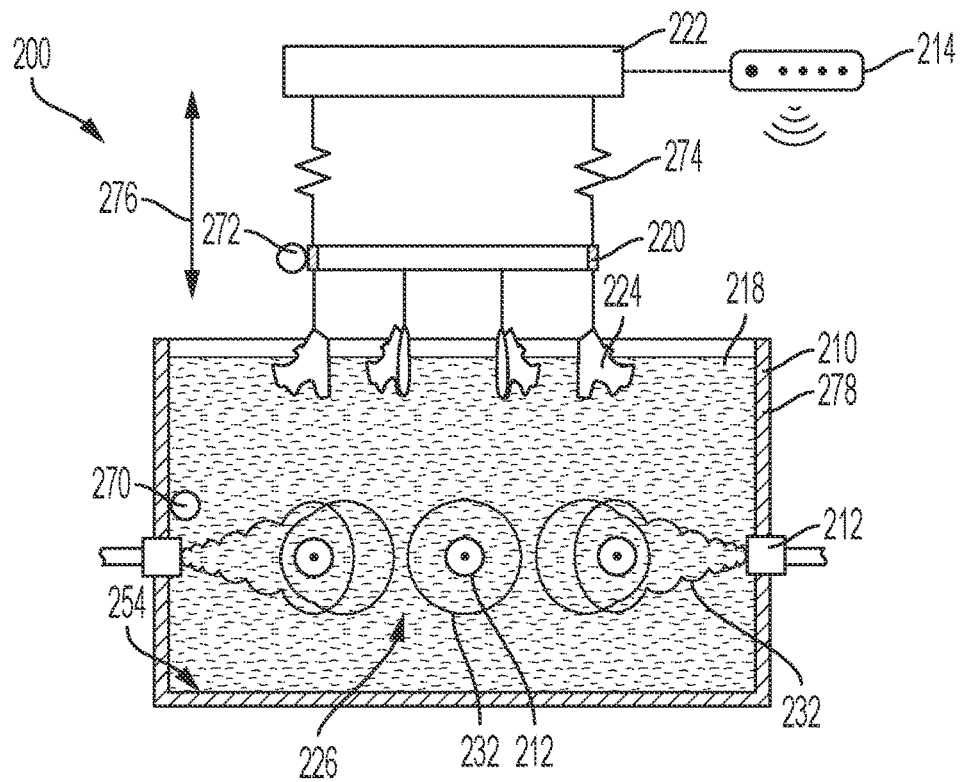
FIG. 3 is a schematic front view of the system of FIG. 2, further depicting a part rack, but omitting the abrasive and fluid management system.
Figure 4:
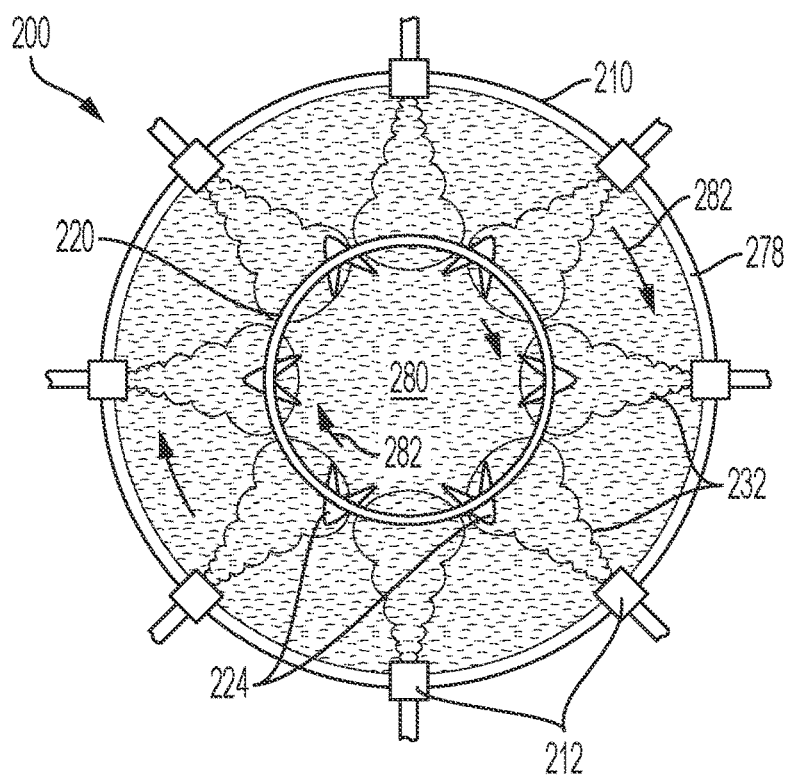
FIG. 4 is a schematic top view of the system elements depicted in FIG. 3.

As shown in FIGS. 2-4, this section describes an illustrative cavitation system 200. System 200 is an example of an automated cavitation processing system such as system 100, described above. System 200 includes a cylindrical tank 210, an array of cavitation nozzles 212, and a controller 214. As depicted in FIG. 2, a high-pressure fluid pump 216 supplies high-pressure water to nozzles 212, and tank 210 is filled with an abrasive slurry 218. As depicted in FIGS. 3 and 4, a part rack 220 on an overhead lift 222 is configured to lower a batch of parts 224 into a treatment zone 226 of tank 210. Nozzles 212 inject the high-pressure water into slurry 218 to induce cavitation, energize abrasive particles, and form a whirlpool in the slurry.

FIG. 2 is a schematic diagram of fluid and abrasive management systems of cavitation system 200. The fluid management system includes high-pressure pump 216, which supplies pressurized water 208 through a manifold 228 to cavitation nozzles 212. The manifold may be connected directly to the nozzles or may be connected to the nozzles by high-pressure hoses 229, as depicted. A control valve 230 may allow precise control of the pressure and flow rate of water supplied by manifold 228 to the nozzles. In some examples, each branch of manifold 228 may include a control valve for individual nozzle control. Cavitation nozzles 212 may be identical, or may vary in size and configuration. In the depicted example, the array includes eight identical nozzles as discussed in more detail below, with reference to FIG. 4.

Water 208 supplied to cavitation nozzles 212 may be under between approximately 1,000 and 22,000 pounds per square inch (PSI), preferably about 8,000 PSI, or any pressure appropriate to produce a cavitating jet from the nozzles. The pressure may be selected to achieve desired cavitation intensity, and may be the same for each nozzle, or may differ between nozzles. In some examples, system 200 may include a plurality of pumps, manifolds, and/or arrays of cavitation nozzles. Cavitation nozzles 212 may all be supplied by high-pressure pump 216 through manifold 228, may each have separate dedicated supplies of precisely controlled high-pressure water, and/or any combination thereof.

Each nozzle 212 dispenses high-pressure water 208 into slurry 218 of tank 210 as a cavitating jet, which interacts with the slurry to form a cloud 232 of imploding cavitation water vapor bubbles and abrasive particles. Slurry 218 is a mixture of an abrasive particulate material 234 and water 236. As high-pressure water 208 is introduced into tank 210 by cavitation nozzles 212, the level of slurry 218 in the tank may rise and the ratio of water to abrasive particles in the slurry may increase.

Slurry 218 is allowed to overflow tank 210 through a conduit 238 into an overflow tank 240. The overflow tank in turn overflows through a filter 242, which is configured to separate water 236 from abrasive material 234. The filtered water is returned to high-pressure pump 216 through a regulator 244 and a supply conduit 246. Regulator 244 is also connected to a water source 248, to deliver additional water to pump 216 as needed. Preferably, system 200 may be operated as close to a closed loop system as is practical, to save water and materials. In some examples, the system may further include additional filters, additives, or water treatment apparatus, for instance to prevent build-up of contaminants or biological lifeforms in the recycled water.

The ratio of water to abrasive particles of slurry 218 in tank 210 may be monitored and maintained by the abrasive management system. Controller 214 is configured to receive feedback on density and overflow of the slurry, and coordinate introduction of water and abrasive material accordingly. Preferably a homogeneous mixture of one third abrasive media by volume may be maintained. Effective maintenance of a selected particulate density may be important to successful and consistent treatment of workpieces.

In the present example, a plurality of laser diffraction sensors 250 are mounted in tank 210. Each sensor may use a laser and a detector to measure a transmission spectrum of slurry 218 to evaluate abrasive particle density in the slurry. That is, the sensors may be configured to measure wavelengths transmitted by the slurry. The sensors are disposed at various locations around tank 210, to account for inhomogeneities in the slurry. For example, sensors may be located at four positions along a peripheral wall of tank 210 and another in a central region of the tank. An average or other statistical aggregation of sensor readings may be considered in management of the slurry, and/or individual readings may be considered according to the corresponding sensor location.

Particles of abrasive material 234 may tend to fall out of suspension in slurry 218 over time, under the action of gravity. To maintain suspension of slurry 218, one or more mixing devices may be positioned in tank 210. For example, a mechanical or ultrasonic agitator, a diaphragm pump, and/or any effective means of stirring, mixing, agitating or otherwise maintaining suspension may be used. For another example, tank 210 may be agitated to unsettle and reintroduce the abrasives into the slurry by using vibratory devices or rocking mechanisms. In the depicted example, system 200 includes a redistribution bot 252.

Redistribution bot 252 is an autonomous vehicle configured to move along a bottom interior surface 254 of tank 210. The bot is equipped with a suction device to collect abrasive sediment 256 from surface 254, and an elevated wide-angle nozzle to re-disperse the collected abrasive material toward the top of slurry 218 in tank 210. Redistribution bot 252 may be fully autonomous, with programming for random or patterned movement over bottom interior surface 254, and/or the bot may receive direction from controller 214. An entirely autonomous bot may be capable of navigating through the entire envelope of the tank while re-distributing highly dense abrasive slurry to areas with less density.

Slurry 218 of overflow tank 240 is allowed to settle out of suspension, without mixing or redistribution. The resulting sediment 258 is collected by a recovery bot 260. The recovery bot is an autonomous vehicle similar to redistribution bot 252, configured to move along bottom interior surface 254 of overflow tank 240 and equipped with a suction device. Recovery bot 260 is connected to an abrasive regulator 262 by a flexible conduit 264. Through the flexible conduit, under control of regulator 262, abrasive material collected by recovery bot 260 is returned to tank 210.

As well as separating abrasive material 234 from water 236, filter 242 removes depleted abrasive material from slurry 218 that has overflowed from overflow tank 240. Abrasive material still in condition for use is returned to overflow tank through a control valve 266. The returned material may settle as sediment 258, and be captured by recovery bot 260 for return to tank 210. In some examples, such abrasive material from filter 242 may be returned directly to tank 210 under the control of regulator 262. In some examples, a separate filter may be used to remove depleted abrasive, positioned in tank 210, redistribution bot 252, or any effective part of system 200.

A source 268 of abrasive material 234 is also connected to regulator 262, allowing addition of fresh abrasive material as needed to replace depleted abrasive. In some examples, the filter and/or device removing depleted abrasive may provide feedback to controller 214 for appropriate addition of abrasive material from source 268.

Controller 214 is configured to regulate and coordinate the fluid and abrasive management systems of cavitation system 200. Controller 214 may include a digital processing system, such as a computer or a programmable logic controller (PLC) as described in Example B, below. Any type of controller may be used, and in some examples the controller may be analog. In the present example, controller 214 includes a processor, a memory and a touch-screen display. The controller may also be accessible for input and/or output of relevant data over a digital network.

The memory of controller 214 includes a plurality of instructions executable by the processor to perform treatment of a workpiece or workpieces. The instructions may be stored as a plurality of sequences or programs appropriate for a variety of treatment processes and/or workpieces. The controller may be programmed by a user of system 200 via the touch-screen, another human-machine interface, and/or a program or programs prepared on another digital processing system may be saved to the controller memory.

Control valves 230 and 266, regulators 244 and 262, pump 216, and other control systems such temperature controls, are in wired or wireless communication with controller 214 to allow precise, coordinated control of water and abrasives throughout system 200. Additionally, controller 214 is operatively connected to overhead lift 222, to control movement of part rack 220 and a secured batch of parts, as discussed further below. Controller 214 also receives real-time sensor data from laser diffraction sensors 250, a tank sensor cluster 270, and a rack sensor 272, as shown in FIG. 3.

Tank sensor cluster 270 is submerged in the slurry 218 of tank 210 to monitor the fluid for relevant parameters. For example, the cluster may include sensors for temperature, pressure, fluid level, viscosity, salinity, carbonate content, metal content, and/or oxygen content. Rack sensor 272 is mounted on part rack 220, to monitor cavitation intensity during treatment. The sensor may be mounted such that the sensor is exposed to cavitation when rack 220 is lowered into tank 210. Sensor 272 may be replaceable and/or include a sacrificial component designed for regular replacement, to account for material removal by repeated exposure to cavitation processing.

Referring again to FIG. 2, additional sensors of any type may be mounted at any point in system 200 appropriate for collecting data to report to controller 214 on relevant conditions and/or system parameters. For example, the system may measure the surrounding ambient temperature, moisture content, barometric pressure, vibration, and/or ultrasonic noise. In some examples, sensor data may be communicated at regular intervals or at a request by the controller. Controller 214 may make adjustments to a treatment process based upon received sensor data.

The collapsing impact force of a cavitation bubble is determined in part by the pressure of injected water 208, the pressure of slurry 218 in tank 210, the ratio between the two pressures, and the temperature of water 208 and slurry 218 of tank 210. In the present example, the temperature of water 208 and slurry 218 is about room temperature, or between approximately 17 and 23 degrees Celsius. The pressure of slurry 218 in tank 210 is atmospheric pressure, or approximately 1 atmosphere (atm).

Controller 214 is configured to maintain such parameters of system 200 within an acceptable operating range and/or within a selected treatment range. For example, when fluid temperature is measured as higher than acceptable, the controller may activate a cooling element and cycle water from filter 242 through the unit. Controller 214 may also be configured to maintain a calculated quantity at an optimal level. For example, a user may program optimal cavitation intensity for a treatment sequence, and controller 214 may adjust parameters of the system as required to maintain the programmed intensity.

In the pictured example, the cavitated liquid is water. However, any desired liquid may be used. Properties such as viscosity of the liquid used may affect collapsing force of cavitation bubbles and a fluid may be chosen to improve impact, or decrease the pressure required for a desired impact level. The liquid may also be selected according to properties of the abrasive material used, and/or to achieve desired properties of slurry 218.

FIG. 3 is a schematic cross-sectional view of system 200, including tank 210 and part rack 220, but omitting the fluid and abrasive management systems for clarity. In some examples, a cavitation peening system, such as shown in FIG. 3, may be practiced without abrasive, relying solely on collapsing cavitation bubbles to achieve desired surface finishing qualities of a workpiece. Rack 220 is depicted with a batch of parts 224 secured. In the present example, each part is suspended from the rack, by a clip. In some examples, the parts may be strapped, fastened, or otherwise fixed to the rack, and may be disposed above, below, or directly on the rack. Rack 220 may support batch of parts 224 and hold the parts in a selected position throughout treatment.

In some examples, rack 220 may support batch of parts 224 without securing the parts. In such examples rack 220 may facilitate lowering the parts into tank 210, and then allow the parts to move freely in the tank during treatment. In an example, rack 220 may include an enclosed mesh compartment, for containing one or more parts during treatment, while allowing some freedom of movement. In the present example, rack 220 is configured supports a plurality of workpieces. In some examples, rack 220 or another structure connected to overhead lift 222 may be configured to support a single workpiece.

In the depicted example, parts 224 are additively manufactured aluminum aircraft components. Additive manufacturing techniques for metal can take advantage of non-traditional designs and usual geometries such as organic-inspired structures. However, the techniques create a level of surface roughness unacceptable for use, on complex surfaces that are difficult to smooth by machining or other processing methods. Cavitation abrasive surface finishing in system 200 may allow efficient finishing of a high volume of such parts.

FIG. 4 is a schematic overhead view of tank 210 and rack 220, which shows a circular shape of the rack. Parts 224 are equally spaced around rack 220, with a matching orientation relative to the rack. Such a symmetrical rack and arrangement of parts may facilitate consistent and even finishing of the parts. Parts 224 are also spaced sufficiently to allow good flow of slurry 218 around all sides of each part. In some examples, other rack shapes and/or part arrangements may be appropriate to other treatment sequences. For instance, a bar-shaped rack with a single line of spaced parts may be appropriate to a treatment sequence including rotation of the rack.

Referring again to FIG. 3, rack 220 is mounted to overhead lift 222 by a spring and damper suspension 274. The suspension may reduce transmission of vibration from rack 220 and secured parts 224 to overhead lift 222 during treatment. In the present example, lift 222 is configured to raise and lower rack 220 as indicated by arrow 276. Batch of parts 224 may be thereby lowered into treatment zone 226 of tank 210 for treatment, and raised out of the tank when a treatment sequence is completed. In some examples, the lift may be further configured to move the rack horizontally, rotate the rack, and/or vibrate or otherwise agitate the rack.

Controller 214 is operatively connected to overhead lift 222, to control and coordinate movement of rack 220 and the secured parts 224 with operation of nozzles 212 and the fluid and abrasive management systems. Each treatment program saved to the controller memory may include coordinated commands to the fluid supply and the overhead lift. For example, a simple treatment program may include activating the pump and open the control valve to initiate generation of cavitation clouds in tank 210. The program may next include lowering rack 220 and parts 224 into treatment zone 226 of tank 210. Once a selected time period has passed, the program may finish by deactivating the pump, closing the control valve, and raising the rack and parts out of tank 210.

In some examples, controller 214 may be programmed to respond to received sensor data by altering the sequence of a treatment program. The controller may alter treatment based on a parameter sensed by rack sensor 272, for instance. For example, the controller may increase a duration of treatment in response to a detected low cavitation intensity, or decrease the duration of treatment in response to a detected high cavitation intensity. The controller may alternatively, or additionally, be programmed to alter treatment duration in response to data received from sensors that monitor relative surface properties, such as smoothness, during a treatment procedure.

As shown in FIGS. 3 and 4, tank 210 is cylindrical and includes a circular outer circumferential wall 278. Tank 210 may also be described as drum shaped. The array of cavitation nozzles 212 is mounted in circumferential wall 278, approximately halfway to the level of slurry 218 in tank 210. A height and diameter of the tank may be selected according to the size of parts 224 and/or the number of parts in each batch. Similarly, the number of nozzles 212 and/or size of nozzles in the array may be selected according to the size of tank 210.

In the present example, the array includes eight cavitation nozzles 212 evenly spaced in a circle around circumferential wall 278. In some examples, additional nozzles out of plane with the circle of nozzles 212 may be included at circumferential wall 278. In some examples, one or more nozzles may be positioned in a central region 280 of tank 210, either at bottom interior surface 254 or raised above the bottom surface by a support or frame structure. In some examples, the array of nozzles 212 may be supported by a frame structure around a periphery of tank 210, inside circumferential wall 278. In such an example, the frame structure may be adjustable, to allow alteration of the array for treating different workpieces. Frame structures supporting nozzles may also be articulated by controller 124.

Nozzles 212 surround and define treatment zone 226 in tank 210. The treatment zone may include portions of the tank an appropriate stand-off distance from nozzles 212, and no more than a selected vertical distance out of plane with the array of nozzles. The appropriate stand-off distance and selection of vertical distance may depend on properties of the cavitation bubble clouds 232 generated by nozzles 212. For example, the nozzles may be positioned between approximately one and twelve inches from the workpiece's path through the treatment zone, to facilitate an appropriate standoff distance during treatment.

Each of nozzles 212 is directed radially inward toward a center point or toward central region 280 of tank 210. As described above, high-pressure water is injected by each nozzle into abrasive slurry 218 as a cavitating jet. An interaction between the cavitating jet and the abrasive slurry forms cloud 232 of cavitation bubbles and abrasive particles. As the bubbles of cloud 232 collapse and transform from vapor to liquid, particles of abrasive material 234 may be excited and energized by the resulting release of energy. The micro-jets created by the collapsing bubbles may collectively accelerate the motion of the particles.

As the mixture of bubbles and particles contact surfaces of parts 224, the particles may impact the surfaces and remove material. That is, the abrasive particles may be acted on by the high forces of the cavitation cloud to smooth parts 224. Normal cavitation peening may also occur, as the cavitation bubbles interact directly with parts 224. The batch of parts may thereby undergo concurrent peening, improving compressive residual stress and fatigue strength.

The high-pressure water injected by nozzles 212 also results in a revolving flow 282 of slurry 218, which may be described as a cavitation induced whirlpool. The circular or drum shape of tank 210 may facilitate the revolving flow. Such flow of slurry may improve uniformity of treatment of parts 224, particularly for parts having complex geometries. The swirling and multi-directional motion of cavitation clouds 232 combined with revolving flow 282 may bring abrasive media into contact with surfaces on all sides of the parts, as well as tight corners, crevices, and internal features.

In some examples, the array of cavitation nozzles 212 may be positioned and/or oriented to enhance revolving flow 282. For instance, the nozzles may each be directed off-center by a corresponding small angle. In some examples, additional nozzles or other mechanisms may be included to enhance or induce revolving flow 282. For example, one or more non-cavitation nozzles may be positioned to inject water tangent to circumferential wall 278.

B. Illustrative Programmable Logic Controller

Figure 5:
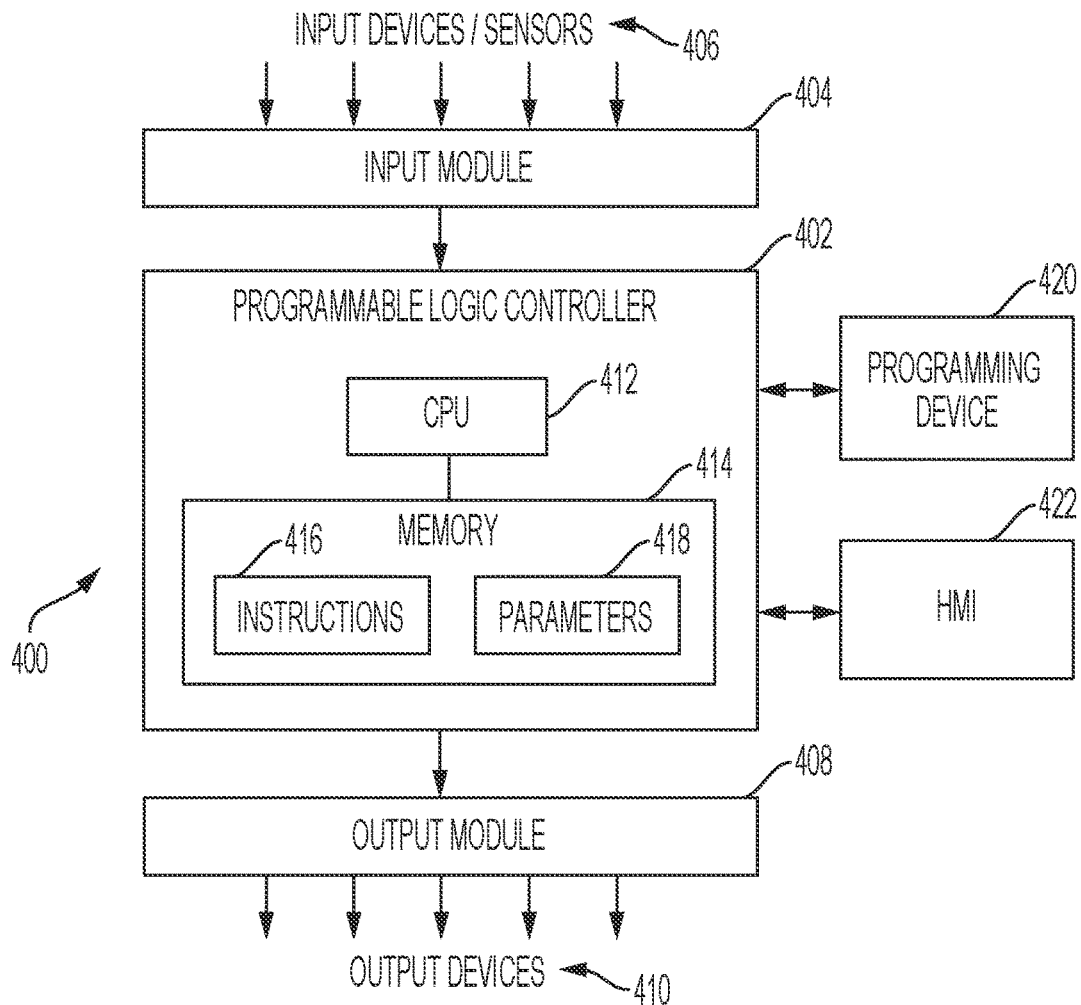
FIG. 5 is a schematic diagram of an illustrative programmable logic controller system.

As shown in FIG. 5, this section describes an illustrative programmable logic controller system 400 (also referred to as a PLC system) suitable for implementing aspects of cavitation processing system controls in accordance with aspects of the present disclosure. PLC system 400 is a programmable controller used for automation of typical industrial processes, and is an example of a data processing system. In examples, the role of a PLC system may be filled by other examples of data processing systems such as a computer, mobile device, and/or networked server. In some examples, devices that are examples of a programmable logic controller system may be included in an automated cavitation peening and/or cavitation abrasive surface finishing system.

In this illustrative example, PLC system 400 includes a programmable logic controller (PLC) 402, also referred to as a controller. PLC 402 includes a central processing unit (CPU) 412, and a memory 414 for storing instructions 416 and parameters 418 necessary to carry out the relevant automation tasks.

Central processing unit 412 serves to execute software programs in the form of instructions 416. The software programs may be loaded into memory 414. Memory 414 may also store parameters 418 needed for operation. A programming device 420 may interface with PLC 402 to facilitate the input of instructions and settings and/or to monitor equipment operation. Programming device 420 may include, for example, a handheld computer or personal computer.

A human machine interface (HMI) 422 may also be placed in communication with PLC 402. HMI 422 facilitates a user-friendly and interactive interface with the system processes and controls. Human machine interface 422 may also assist an operator in determining machine conditions, in changing machine settings, and/or displaying faults.

PLC system 400 includes an input module 404 in receiving communication with one or more input devices/sensors 406, and an output module 408 in outgoing communication with one or more output devices 410. Input devices 406 may include for example sensors 250, 270, and/or 272 as described above. Output devices 410 may include for example control valves 230, 266, regulators 244, 262, bots 252, 260, and/or pump 216 as described above.

Both modules 404 and 408 are hardware devices in communication with PLC 402. In some examples, communication with PLC 402 may be carried out via an optical (or otherwise wireless) interface, such that PLC 402 is electrically isolated from the input and output modules.

Input module 404 may convert analog signals from input devices/sensors 406 into digital and/or logic signals that the PLC can use. Signal types may be digital or analog. With these signals the CPU may evaluate the status of the inputs. Upon evaluating the input(s), along with known output states and stored program parameters and instructions, the CPU may execute one or more predetermined commands to control the one or more output devices. Output module 408 may convert control signals from the CPU into digital or analog signals which may be used to control the various output devices.

HMI 422 and programming device 420 may provide for communications with other data processing systems or devices, e.g., through the use of physical and/or wireless communications links.

Modules 404 and 408 allow for input and output of data with other devices that may be connected to PLC 402. For example, input module 404 may provide a connection for temperature or pressure measurements, valve or machine status, tank level status, user input through a keyboard, a mouse, and/or any other suitable input device. Output module 408 may send output to an actuator, indicator, motor controller, printer, machine, display, and/or any other suitable output device.

C. Illustrative Method

Figure 6:
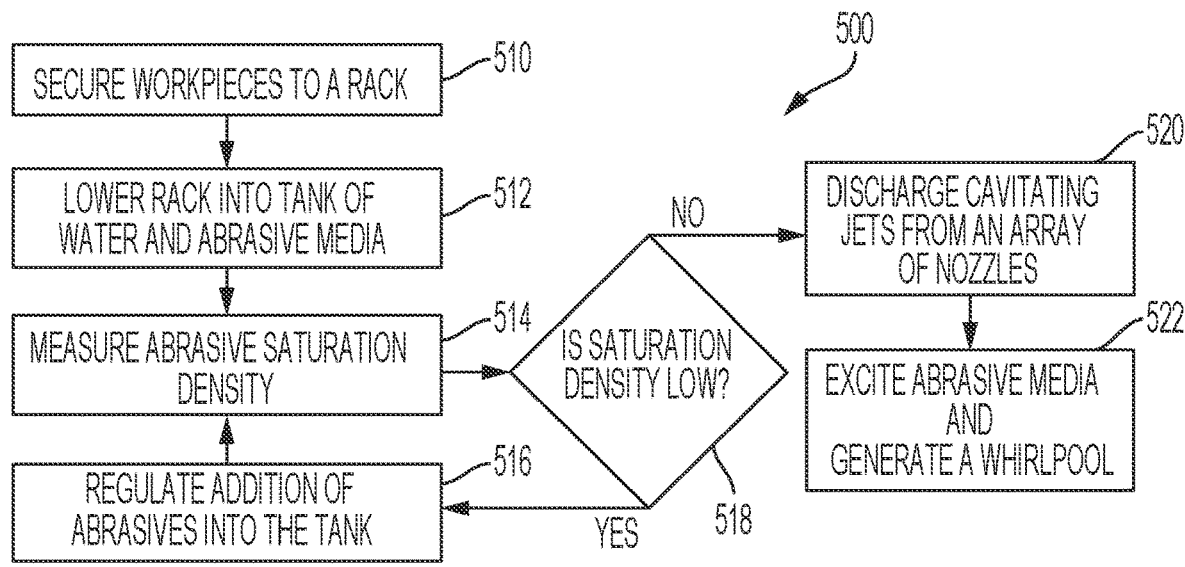
FIG. 6 is a flow chart depicting steps of an illustrative method for automated cavitation processing according to the present teachings.

This section describes steps of an illustrative method for automated cavitation abrasive surface finishing; see FIG. 6. Aspects of cavitation processing systems and apparatus described above may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of method 500 are described below and depicted in FIG. 6, the steps need not necessarily all be performed, and in some cases may be performed simultaneously or in a different order than the order shown.

At step 510, the method includes securing workpieces to a rack. Each workpiece may be any part, component, or object needing cavitation peening, cavitation abrasive surface finishing, and/or other cavitation processing. The workpieces may be identical, or may differ. For example, the workpieces may be a batch of matching additively manufactured aluminum aircraft components, requiring surface smoothing. For another example, the workpieces may include a variety of titanium components requiring alpha case removal. In some examples, the method may include securing a single workpiece to the rack, or securing each workpiece to a separate rack.

Securing the workpieces may include clipping, strapping, fastening, enclosing, or otherwise retaining the workpieces to the rack. The workpieces may be on the rack, or suspended from the rack. The rack may be supported by an automated and/or powered manipulation device such as a crane, lift, or computer controller arm. The manipulation device may be in wired or wireless communication with a programmable electronic controller, such that the controller can signal the manipulation device to move the rack.

Step 512 of the method includes lowering the rack into a tank containing a slurry of water and abrasive media. The rack may be lowered according to instructions from the electronic controller. The rack may be lowered such that the workpieces secured to the rack are submerged in the slurry, and positioned in a treatment zone or pre-selected location in the tank. The tank may be cylindrical, and sized to receive the rack and the workpieces with ample space to allow free flow of the slurry around the workpieces.

In some examples, the rack may be lowered and then remain stationary until method 500 is completed. In other examples, the rack may be moved according to a treatment sequence, as described further with reference to step 520. In some examples, the workpieces may be released from the rack into the tank, to move freely during treatment.

At step 514, the method includes measuring abrasive saturation density in the slurry contained by the tank. Any effective sensor or measuring device may be used to take the measurement. For example, a sensor utilizing laser diffraction analysis or laser diffraction spectroscopy may be positioned in the tank. For another example, a plurality of strain gauges may be positioned underneath the tank to measure total weight of the tank and detect changes in weight due to changes in abrasive saturation density.

Step 516 includes determining whether the measured abrasive saturation density is low. The measured density may be compared to a selected or optimal density. For example, one third abrasive media by weight may be preferable for cavitation abrasive surface finishing. Maintaining a selected density may be important to successful abrasive processing. If the measured density is low, step 518 is performed next.

Step 518 includes regulating addition of abrasives into the tank. Addition of media may be governed by a regulator and/or control valve under the direction of the electronic controller. Fresh abrasive media may be added from an abrasive media supply, and/or recycled abrasive media may be added from a recovery system. For example, abrasive media settled out of the slurry as sediment on the bottom of the tank may be collected and reintroduced.

A quantity of abrasive media to add to the tank may be determined based on the measurement performed in step 514 and/or based on feedback from an abrasive recovery or management system. For example, a weight of sediment collected from the bottom of the tank may be communicated to the electronic controller. For another example, depleted abrasive media may be filtered out of the tank, and the volume of depleted abrasives removed may be communicated to the controller.

In some examples, step 518 may further include mixing the slurry contained in the tank to improve homogeneity, maintain density, and avoid media accumulation. Mixing may be performed with one or more agitators, mixers, diaphragm pumps, and/or autonomous vehicles.

Steps 514, 516 and 518 may be repeated throughout the remainder of method 500. That is, if the measured density is determined not to be low in step 516, step 520 is performed next, but step 514 may also be repeated. In other words, method 500 may include measuring, evaluating, and regulating abrasive saturation density throughout treatment of workpieces. Other parameters important to processing success, efficiency, or quality may be similarly measured, evaluated, and regulated throughout treatment. For example, pressure, temperature, oxygen saturation, and/or contaminant levels may be similarly managed.

Step 520 of method 500 includes discharging cavitating jets from an array of nozzles. The nozzles of the array may be cavitation nozzles, having an internal geometry configured to discharge a high-pressure fluid as a cavitating jet. Each nozzle may generate cavitation bubbles, which may combine to form a cloud of vapor bubbles. The array of nozzles may be oriented toward a treatment zone in the tank and/or toward the workpieces submerged in the tank. The nozzles may be adjacent and/or surrounding the treatment zone, and may be positioned and/or oriented to produce desired cavitation intensity at the workpieces.

At step 522, the method includes exciting abrasive media and generating a whirlpool. As the vapor bubbles generated by the cavitating jets discharged from the nozzles collapse, particles of abrasive material in the slurry contained in the tank may be kinetically excited and energized. The mixture of bubbles and particles may contact surfaces of the submerged workpieces, the particles impacting the surfaces and remove material. Cavitation peening may also occur, as the cavitation bubbles interact directly with the workpieces.

The jet discharged by the nozzles into the slurry contained in the tank may set up currents, ebbs, or flows of slurry. Circular or cylindrical walls of the tank and appropriate orientation of the array of nozzles may direct those flows into a revolving pattern or whirlpool. Such whirlpool action of the slurry may effectively deliver cavitation bubbles and excited abrasive particles to all surfaces of the workpieces, facilitating efficient and uniform treatment of the workpieces.

Steps 520 and 522 may be described as treatment of the workpieces. During treatment, the rack may be moved to facilitate treatment. For example, The rack may be translated at a constant rate; or may stop, start, accelerate and/or decelerate. The rack may be translated vertically up and/or down; horizontally left, right, forward, and/or back; rotated; and/or agitated. A sequence of timed movements may be programmed into the electronic controller, for consistent and exact repetition.

Steps 520 and 522 may be performed for a pre-selected time period. That is, an optimal duration of treatment may be calculated, to achieve desired treatment results. Appropriate treatment times may depend on the abrasive media used, cavitation intensity achieved, workpiece material, and/or level of treatment desired. For example, long treatment times may be appropriate for alpha-case removal from surfaces of titanium components and shorter treatment times may be appropriate for minimal surface finishing of aluminum components.

In some examples, method 500 may include moving or adjusting the nozzles prior to and/or during the discharging step. In other words, positions of the nozzles may be adjusted prior to treatment or the nozzles may be configured to move during treatment. In some examples, the nozzles may be directed to move according to a sequence programmed into the controller. In some examples, the nozzles may be adjusted to a layout designed for a particular rack, type of workpiece, and/or batch size, prior to treatment.

Method 500 may be repeated, to process of a large number of workpieces. The method may be automated such that the method can be completed with little to no user action required, subsequent to setup. That is, a user may program the controller to execute the method and/or steps 512-522 of the method.

After method 500 is complete, the rack may be raised out of the tank and the workpieces removed from the rack. The workpieces may be rinsed or otherwise post-processed. In some examples, the workpieces may be removed after the rack has been moved to another workstation for post-processing of the workpieces.

Illustrative Combinations and Additional Examples

This section describes additional aspects and features of cavitation processing systems and methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A cavitation peening system, comprising:
a tank containing a fluid,
a carrier configured to deliver a workpiece to a treatment zone in the tank, and
an array of cavitation nozzles collectively configured to generate a cavitation induced whirlpool in the treatment zone.

A1. The system of A0, wherein the array of nozzles surrounds the treatment zone.

A2. The system of A0 or A1, wherein the tank has a peripheral wall surrounding the treatment zone, the nozzles being connected to the peripheral wall.

A3. The system of any of A0-A2, further comprising a frame structure inside the tank, supporting the nozzles.

A4. The system of A3, wherein the frame structure is adjustable to alter the array of nozzles for treating different workpieces.

A5. The system of any of A0-A4, wherein the carrier includes a rack for supporting a workpiece in the treatment zone during a cavitation peening process, and a manipulation device connected to the rack and configured to move the rack and the supported workpiece in and out of the treatment zone.

A6. The system of A5, wherein the manipulation device is configured to move the rack vertically in and out of the tank.

A7. The system of A5 or A6, wherein the manipulation device is configured to rotate the rack in the treatment zone.

A8. The system of any of A5-A7, wherein the manipulation device is configured to move the rack horizontally through the treatment zone.

A9. The system of any of A0-A8, wherein the fluid in the tank comprises liquid and abrasive media.

A10. The system of A9, further comprising:
a mixing device inside the tank for maintaining a substantially homogenous density of abrasive media in the fluid.

A11. The system of A10, further comprising:
an abrasive media supply, configured to add abrasive media to the tank,
a density monitoring system, configured to monitor a density of abrasive media in the fluid contained in the tank,
a reclamation system, configured to collect abrasive media from the tank, and
a controller configured to receive data from the density monitoring system, and regulate the abrasive media supply and the reclamation system to maintain abrasive media in a selected density range inside the tank.

A12. The system of any of A0-A11, wherein the cavitation induced whirlpool comprises a revolving flow of the fluid including a plurality of cavitation bubbles.

B0. A cavitation abrasive surface finishing system, comprising:
a treatment zone in a tank containing a slurry of a fluid and an abrasive media,
a plurality of cavitation nozzles directed toward the treatment zone and connected by high-pressure hoses to a high-pressure fluid pump,
an abrasive media supply, configured to add abrasive media to the tank,
a density monitoring system, configured to monitor a density of abrasive media in the slurry contained in the tank,
a reclamation system, configured to collect abrasive media from the tank, and
a controller configured to receive data from the density monitoring system, and regulate the abrasive media supply and the reclamation system to maintain a selected density of abrasive media in the slurry contained in the tank.

B1. The system of B0, wherein the density monitoring system includes a strain gauge configured to weigh the tank.

B2. The system of B0 or B1, wherein the density monitoring system includes a laser diffraction sensor configured to measure wavelengths transmitted by the slurry contained in the tank.

B3. The system of any of B0-B2, wherein the reclamation system includes an autonomous vehicle configured to move over a bottom interior surface of the tank and collect sediment.

B4. The system of any of B0-B3, wherein the reclamation system includes a filter to remove depleted abrasive media.

B5. The system of any of B0-B4, wherein the reclamation system includes an overflow tank.

B6. The system of any of B0-B5, further including a mixing device, configured to maintain suspension of abrasive media in the slurry contained in the tank.

C0. An automated cavitation peening system, comprising:
a tank filled with a fluid,
a plurality of cavitation nozzles positioned around a periphery of the tank, and directed toward a central region of the tank,
a fluid supply including a pump connected to a manifold, and supplying high-pressure fluid to the plurality of cavitation nozzles,
a rack configured to support a workpiece,
a manipulation device configured to lower the rack into the tank,
a controller regulating the supply of high-pressure fluid, and directing movement of the manipulation device.

C1. The system of C0, wherein the tank is cylindrical.

C2. The system of C1, wherein the plurality of cavitation nozzles are evenly spaced around a circumferential wall of the cylindrical tank.

C3. The system of C2, further including a cavitation nozzle positioned proximate the central region of the cylindrical tank.

C4. The system of any of C1-C3, wherein a plurality of cavitation clouds generated by the cavitation nozzles result in a whirlpool action of the fluid filling the tank.

C5. The system of any of C0-C4, wherein the manipulation device is further configured to rotate the rack.

C6. The system of any of C0-05, wherein the fluid filling the tank is a slurry of water and an abrasive media.

C7. The system of C6, further including a slurry monitoring system, configured to monitor and maintain a selected density of the abrasive media.

C8. The system of any of C0-C7, wherein the rack is configured to support a plurality of workpieces for concurrent peening.

D0. A method of cavitation abrasive surface finishing, comprising:
securing workpieces to a rack,
lowering the rack into a tank filled with a mixture of a liquid and an abrasive,
measuring abrasive saturation density,
in response to a low density measurement, regulating addition of abrasives into the tank, and
discharging cavitating jets from an array of nozzles in the tank to excite the abrasive and generate a whirlpool in the mixture filling the tank.

E0. A method of cavitation peening, comprising:
securing at least one workpiece to a material handling device,
executing a program stored in the memory of an electronic controller, the program including a plurality of instructions executable by a processor of the electronic controller to:

lower the material handling device into a tank filled with a fluid, discharge cavitating jets from an array of nozzles in the tank to form cavitation bubbles and generate a whirlpool in the mixture filling the tank.

E1. The method of E0, wherein the plurality of instructions are further executable to move the material handling device while discharging cavitating jets, the movement include one of (a) vertical movement, (b) horizontal movement, (c) rotation, or (d) agitation.

E2. The method of E0 or E1, wherein the plurality of instructions are further executable to receive sensor data for at least one parameter related to cavitation intensity.

Advantages, Features, and Benefits

The different examples of the automated cavitation processing apparatus, systems, and methods described herein provide several advantages over known solutions for peening and surface finishing. For example, illustrative examples described herein allow fully automated processing.

Additionally, and among other benefits, illustrative examples described herein allow efficient batch processing of parts.

Additionally, and among other benefits, illustrative examples described herein allow safe and cost effective part finishing, including peening, cleaning, smoothing, and material removal.

Additionally, and among other benefits, illustrative examples described herein accommodate a wide range of part types and geometries.

No known system or device can perform these functions, particularly with consistent and repeatable results. Thus, the illustrative examples described herein are particularly useful for production scale implementation. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A cavitation peening system, that comprises:
a controller;
a tank that contains a fluid, wherein the tank comprises a drum shape configured to facilitate a whirlpool flow of the fluid;
a carrier that comprises a rack configured to:
releasably secure a workpiece;
deliver the workpiece to a treatment zone in the tank; and
move the rack in the treatment zone through a sequence of events, wherein the controller directs a rate which the carrier moves the rack, and wherein the rack comprises a rack sensor configured to monitor a cavitation intensity of the fluid; and
an array of cavitation nozzles collectively configured to cavitate the fluid and induce the whirlpool flow in the treatment zone.

2. The system of claim 1, wherein:
the tank comprises a peripheral wall that surrounds the treatment zone;
each nozzle in the cavitation nozzles are connected to the peripheral wall with individual supplies of the fluid at individual pressures; and
the rack sensor comprises a replaceable sacrificial component.

3. The system of claim 1, further comprising:
a sensor configured to monitor a smoothness of the workpiece;
a frame structure inside the tank, that supports the cavitation nozzles; and
a diaphragm pump vehicle in the tank configured to mix the fluid.

4. The system of claim 1, wherein:
each cavitation nozzle in the array of cavitation nozzles is configured to expel the fluid at a pressure that produces a desired cavitation intensity; and
the carrier comprises a manipulation device connected to the rack.

5. The system of claim 4, wherein:
the rack is further configured to simultaneously hold a second workpiece that comprises a different shape than the workpiece; and
the manipulation device is configured to move the rack forward, back, left, and right within the tank.

6. The system of claim 4, wherein:
configurations of some the cavitation nozzles vary from each other; and
the manipulation device is configured to rotate the rack in the treatment zone.

7. The system of claim 1, wherein:
the fluid in the tank comprises liquid and abrasive media; and
the workpiece comprises titanium in an alpha case; and
the whirlpool flow comprises a force sufficient to remove the alpha case.

8. The system of claim 7, further comprising:
an abrasive media supply, configured to add the abrasive media to the tank,
a density monitoring system, configured to monitor a density of the abrasive media in the fluid contained in the tank,
a reclamation system, configured to collect abrasive media from the tank, and
the controller configured to receive data from the density monitoring system, and regulate;
the abrasive media supply, and
the reclamation system to maintain abrasive media in a selected density range inside the tank.

9. The system of claim 1, wherein the cavitation induced whirlpool flow comprises a revolving flow of the fluid including a plurality of cavitation bubbles.

10. A cavitation abrasive surface finishing system that comprises:
a treatment zone in a tank that contains a slurry of a fluid and an abrasive media, a carrier configured to transport a workpiece into the tank and control a rate of movement of the workpiece within the tank, wherein the carrier comprises a rack that comprises a rack sensor configured to measure a cavitation intensity;

a plurality of cavitation nozzles directed toward the treatment zone and connected by high-pressure hoses to a high-pressure fluid pump and configured to induce a whirlpool flow of the fluid, an abrasive media supply, configured to add abrasive media to the tank, a density monitoring system, configured to monitor a density of abrasive media in the slurry contained in the tank, a reclamation system, configured to collect abrasive media from the tank, and a controller configured to:
receive data from the density monitoring system;
determine the rate of movement of the workpiece; and
regulate the abrasive media supply and the reclamation system to maintain a selected density of abrasive media in the slurry contained in the tank.

11. The system of claim 10, wherein:
the density monitoring system includes a laser diffraction sensor configured to measure wavelengths transmitted by the slurry contained in the tank;
the workpiece comprises titanium in an alpha case; and
the whirlpool flow comprises a force sufficient to remove the alpha case.

12. The system of claim 10, wherein:
each cavitation nozzle is configured to expel the fluid at a pressure that produces a desired cavitation intensity; and
the reclamation system includes an autonomous vehicle configured to move over a bottom interior surface of the tank and collect sediment.

13. The system of claim 10, wherein:
the rack sensor comprises a sacrificial component; and
the reclamation system includes a filter configured to remove depleted abrasive media.

14. The system of claim 10, wherein:
the rack is further configured to hold multiple workpieces of different shapes;

some of the plurality of cavitation nozzles comprise a shape that differs from each other; and
the reclamation system includes an overflow tank.

15. The system of claim 10, further comprising:
a sensor configured to monitor a smoothness of the workpiece; and
a mixing device, configured to maintain suspension of abrasive media in the slurry contained in the tank.

16. An automated cavitation peening system, that comprises:
a tank that comprises a drum shape filled with a fluid;
a plurality of cavitation nozzles positioned around a periphery of the tank and directed toward a central region of the tank,
a fluid supply that comprises a pump connected to a manifold that comprises valves that control a delivery of the fluid supply to each of the plurality of cavitation nozzles at a pressure that produces, respectively, a desired cavitation intensity from each of the cavitation nozzles;
a rack configured to support a workpiece, wherein the rack comprises a rack sensor configured to monitor a cavitation intensity of the fluid;
a manipulation device configured to lower the rack into the tank and move the rack in a treatment zone through a sequence of events,
a controller configured to:
control the valves and regulate the supply of high-pressure fluid; and
control a direction and rate of a movement of the manipulation device.

17. The system of claim 16, wherein the rack sensor comprises a sacrificial component.

18. The system of claim 17, wherein the plurality of cavitation nozzles are evenly spaced around a circumferential wall of the tank.

19. The system of claim 17, wherein a plurality of cavitation clouds generated by the nozzles result in a whirlpool action of the fluid filling the tank.

20. The system of claim 16, wherein the rack is configured to support a plurality of different shaped workpieces for concurrent peening.

* * * * *

UNITED STATES PATENT AND TRADEMARK OFFICE
CERTIFICATE OF CORRECTION

| | |
|---|---|
| PATENT NO. | : 12,296,431 B2 |
| APPLICATION NO. | : 17/541195 |
| DATED | : May 13, 2025 |
| INVENTOR(S) | : Daniel Gordon Sanders and Kandaudage Channa Ruwan De Silva |

It is certified that error appears in the above-identified patent and that said Letters Patent is hereby corrected as shown below:

In the Claims

Column 18, Lines 61-62, correct "the cavitation induced whirlpool flow" to read -- the whirlpool flow --

Signed and Sealed this
Tenth Day of June, 2025

Coke Morgan Stewart
*Acting Director of the United States Patent and Trademark Office*